United States Patent
Lynch

(10) Patent No.: US 9,472,325 B2
(45) Date of Patent: *Oct. 18, 2016

(54) INSULATOR COVER WITH SECURING CLIP FOR ELECTRICAL DISTRIBUTION SYSTEMS

(71) Applicant: Eco Electrical Systems, Reno, NV (US)

(72) Inventor: Michael Lynch, Reno, NV (US)

(73) Assignee: Eco Electrical Systems, Reno, NV (US)

( * ) Notice: Subject to any disclaimer, the term of this patent is extended or adjusted under 35 U.S.C. 154(b) by 319 days.

This patent is subject to a terminal disclaimer.

(21) Appl. No.: 14/160,250

(22) Filed: Jan. 21, 2014

(65) Prior Publication Data

US 2015/0207305 A1 Jul. 23, 2015

(51) Int. Cl.
*H02G 7/14* (2006.01)
*H02G 1/04* (2006.01)
*H01B 17/00* (2006.01)
*H02G 3/30* (2006.01)

(52) U.S. Cl.
CPC ............... *H01B 17/00* (2013.01); *H02G 3/24* (2013.01); *Y10T 29/49002* (2015.01)

(58) Field of Classification Search
CPC ............................... H01B 17/00; H02G 3/24
USPC .................................................. 174/40 CC
See application file for complete search history.

(56) References Cited

U.S. PATENT DOCUMENTS

| | | | | |
|---|---|---|---|---|
| 1,239,902 A * | 9/1917 | Goodard | ............... | H01B 17/16 174/186 |
| 2,311,486 A * | 2/1943 | Swearingen | ........... | H01B 17/22 174/172 |
| 3,639,681 A * | 2/1972 | Ettlinger | ............... | H01B 17/56 174/138 F |
| 4,810,837 A * | 3/1989 | Giroux | .................... | H01B 17/22 174/172 |
| 6,353,187 B1 * | 3/2002 | Wilson, Jr. | ........... | H01B 17/145 174/158 F |
| 7,154,034 B2 * | 12/2006 | Lynch | .................. | H01H 31/006 174/138 E |
| 7,154,036 B2 * | 12/2006 | Lynch | ..................... | H02G 7/00 174/138 F |
| 7,297,869 B2 * | 11/2007 | Hiller | ..................... | H01B 17/00 119/174 |
| 7,301,096 B2 * | 11/2007 | Strong | ................... | H01B 17/00 174/5 R |
| 8,957,314 B2 * | 2/2015 | Niles | ........................ | H02G 7/00 174/138 F |

* cited by examiner

*Primary Examiner* — William H Mayo, III
*Assistant Examiner* — Hiram E Gonzalez
(74) *Attorney, Agent, or Firm* — Patent Law Group LLP; Brian D. Ogonowsky

(57) ABSTRACT

A dielectric cover system for an insulator supporting a high voltage conductor is molded to fit over the insulator to cover at least a top portion of the insulator and the conductor in contact with the insulator. A clip internal to the cover allows the cover to be freely placed over the insulator and then effectively restricts an inner diameter of the cover at a reduced diameter neck portion of the insulator, such that the clip blocks the cover from being lifted off the insulator and rotated about the insulator during high wind conditions. The clip is particularly effective where the conductor is supported in a side groove of the insulator, so the insulator and conductor form an asymmetric structure.

15 Claims, 3 Drawing Sheets

INSULATOR COVER WITH SECURING CLIP FOR ELECTRICAL DISTRIBUTION SYSTEMS

FIELD OF THE INVENTION

This invention relates to an insulating cover system for high voltage power line insulators and, in particular, to a cover system that is adapted to prevent the cover from tilting or rotating due to high winds while covering the insulator.

BACKGROUND

High voltage (HV) electrical distribution systems typically use utility poles or towers that support insulators, such as ceramic insulators, and the insulators support conductors that carry the high voltage. The ceramic insulators are affixed to the crossarms by bolts. The HV conductor (typically twisted wire strands) seats in a groove in the insulator and is affixed to the insulator via a metal tie wire. The groove may be on top of the insulator or on the side of the insulator.

Frequently, there are three parallel cables, each carrying a different phase. If there is a short to ground or a short between cables, a fuse or breaker will trip, causing a power outage or a rerouting of the electricity. A lineman must then fix the problem and refuse or reset the fuse/breaker.

FIG. 1 is a perspective view of a conventional ceramic insulator 10 that is mounted on a wooden pole (not shown) using conventional hardware, such as a bracket or a bolt. Round insulators are typically 4-8 inches in diameter. A bare cable 12 (a conductor) is secured to the insulator 10 by a wire (not shown) twisted around the insulator neck 13 and the cable 12. FIG. 2 is a top down view of the insulator 10 and cable 12. For three phase distribution, there are typically two insulators/cables at the ends of a wooden crossarm and one insulator/cable supported in the middle or on the top of the pole.

When there is a straight run of the cable 12, the cable 12 may be supported by the indent 14 at the top of the insulator 10 or may be tied to the side of the neck 13. A twisted wire keeps the cable 12 in place. When the cable path needs to change direction, the cable 12 is bent around the neck 13 of the insulator 10, as shown in FIGS. 1 and 2.

In locations where there are large birds, or other animals, dielectric cable shields (which include an insulator cover) are sometimes used to prevent such birds or animals contacting two or more of the-energized or grounded cables.

Prior art insulator covers for covering the insulator 10 in FIG. 1 are typically designed for the symmetrical insulator/wire configuration, where the cable 12 is supported by the top indent 14 of the insulator 10. If a prior art cover were used with the asymmetrical configuration of FIG. 1, the cover would undesirably seat at an angle over the insulator 10. The cover is somewhat larger than the insulator, so there is some play between the cover and insulator.

Additionally, different conductor diameters may be used with the same type of insulator, where the diameter may be selected based on the required voltage or current transmitted or the distance between poles. This further creates unpredictability in the insulator cover's ability to be properly oriented with respect to the insulator and conductor.

In either the symmetrical or asymmetrical case, the prior art covers are not secured to the insulator 10 and cable 12, and a high wind may catch the open underside of the cover and rotate it with respect to the insulator 10 and cable 12, reducing the effectiveness of the cover in protecting wildlife and preventing shorts. If a cover is rotated, it may jeopardize the leakage distance of the insulator and electrically short the insulator. If a rotated or tilted cover is spotted, a lineman must reorient the cover. The problem with tilted covers is more extreme when the conductor is tied to the side of the insulator, as shown in FIG. 1. In FIG. 1, the rotation point of the cover may be around the off-centered cable 12, so the cover more easily lifts off from the opposite side. This exact problem with prior art insulator covers has been reported to the present inventor by a power company, and the inventor was asked to design an improved insulator/conductor cover that did not rotate about the cable and insulator with high winds.

Therefore, what is needed is a practical cover system for an insulator/cable that can accommodate symmetrical and asymmetrical insulator/cable configurations and which cannot be rotated or even tilted when subjected to high winds.

SUMMARY

A semi-rigid insulator cover, in accordance with one embodiment of the present invention, has a shape that can accommodate both symmetrical and asymmetrical insulator/cable configurations while being in the same proper orientation. In one embodiment, the insulator cover has an internal securing clip, such as made of a dielectric plastic, that seats in the narrowed neck area of the insulator to prevent the cover from being lifted or rotated with respect to the insulator.

If the clip is rigid, the cover is placed over the insulator while being tilted to cause the clip to enter the narrowed neck area of the insulator. Then the cover is un-tilted to assume the proper position over the insulator while the clip becomes further inserted within the narrowed neck area of the insulator. If the clip is resilient, the cover may just be pushed down vertically over the top of the insulator, and the clip snaps into place after passing the ear portion of the insulator.

The lineman then inserts a pin through holes in the cover that extend just below the cable (supported by one side of the insulator neck). This prevents the cover from being lifted off (tilted) from the cable-side of the insulator. In one embodiment, there are two sets of the holes on either side of the insulator. The clip is located on the side of the cover opposite to the side that the cable is located. Therefore, the clip prevents the cover being lifted off (tilted) from the opposite side of the cable.

Since the cover is now restricted by both the pins and the clip, it can neither be lifted off the insulator nor rotated about the insulator.

The same cover may also be used when the cable is tied to the top of the insulator. However, if the pins are sufficiently close to the centered conductor, the clip may not be needed to prevent rotation but does not hamper the installation of the cover. In one embodiment, the clip can be easily removed from the cover without tools if not needed.

Different designs of covers, all including the clip, may be fabricated for use with different types of insulators, such as longer insulators having ridges.

In a preferred embodiment of the invention, the insulator cover also includes an arm attachment feature for a cable cover. As an additional securing feature, the arms include holes that are below the cables. A push pin is passed through the holes so as to additionally block the arms from being lifted off the cables. However, such pins, by themselves, may not prevent rotation of the cover system about the cable and insulator. The previously described securing clip prevents such rotation.

Other features of the cover system are also described.

BRIEF DESCRIPTION OF THE DRAWINGS

Elements labeled with the same numerals may be identical or similar.

DETAILED DESCRIPTION

Figure 1:
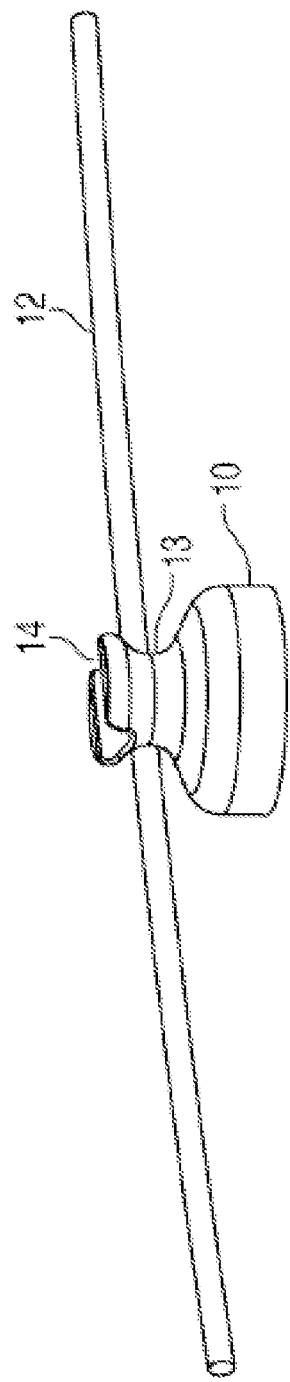
FIG. 1 is a perspective view of a conventional ceramic insulator on a crossarm of a utility pole supporting a HV cable seated in a side groove of the insulator.
Figure 2:
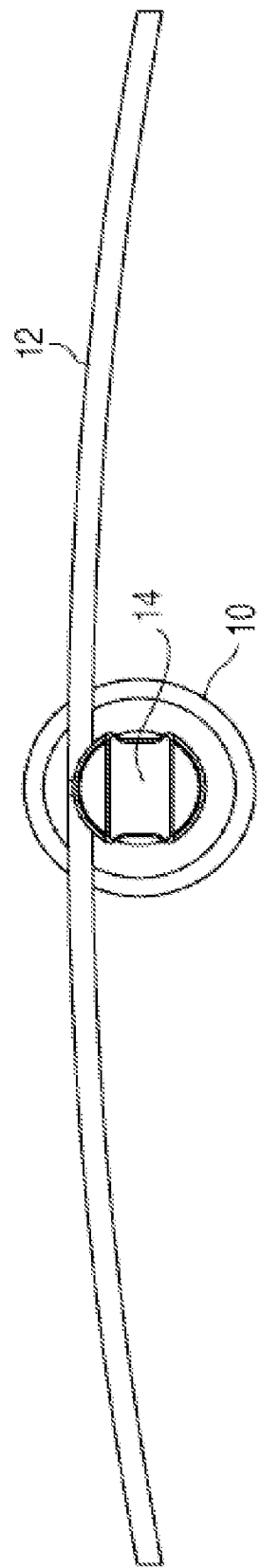
FIG. 2 is a top down view of insulator of FIG. 1.
Figure 3:
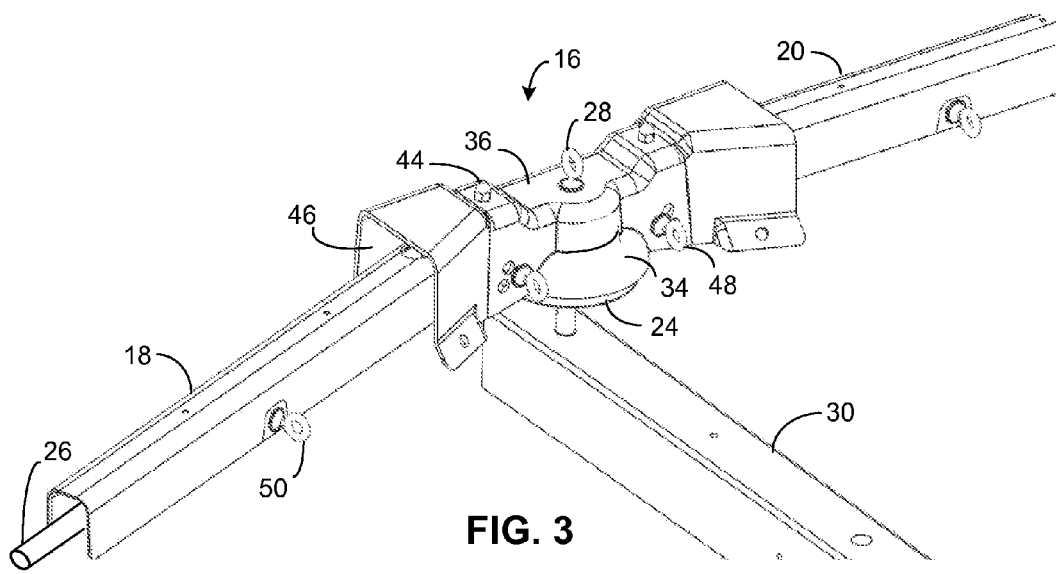
FIG. 3 is a perspective view of an insulator/cable cover having an internal securing clip, in accordance with one embodiment of the invention.

FIG. 3 is a perspective view of a semi-rigid insulator cover 16 and attachable arms 18/20 installed over an insulator 24 and cable 26, where a securing clip internal to the cover 16 is secured to the cover 16 with a plastic bolt 28. All materials may be polymers, such as HDPE, or other type of moldable durable dielectric material. The cover 16 does not significantly distort under high wind conditions. The insulator 24 is shown attached to a crossarm 30 of a utility pole.

Figures 4, 5A, 5B:
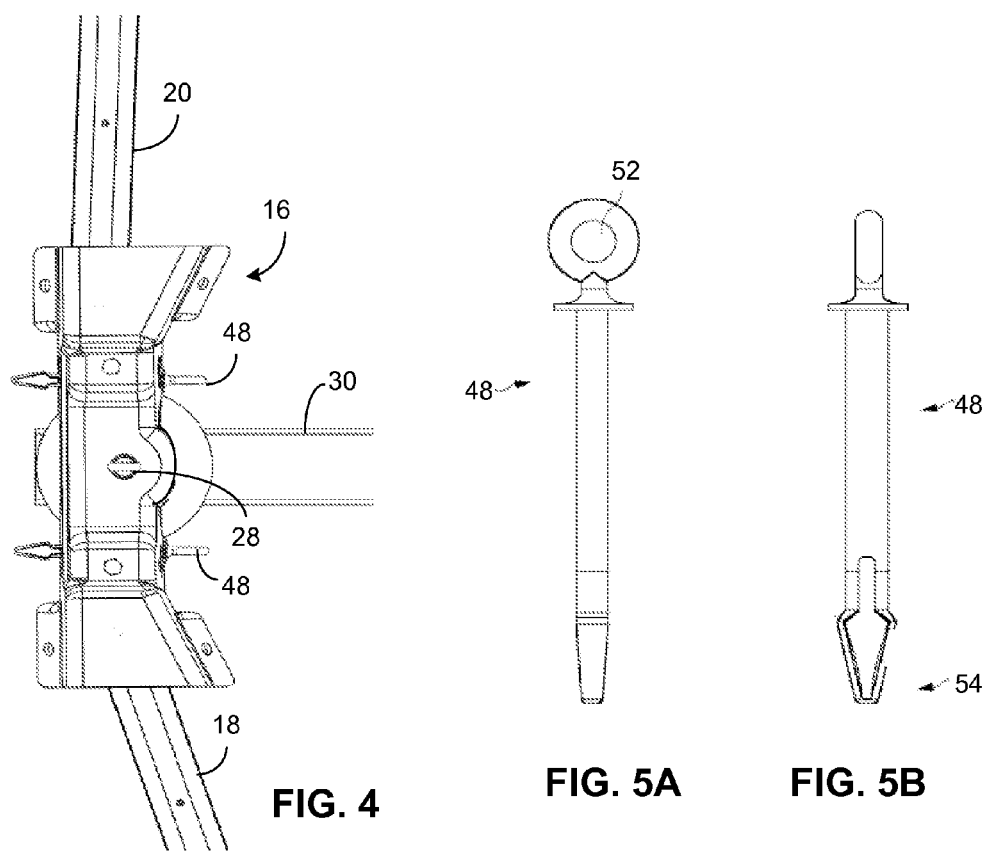
FIG. 4 is a top down view of the cover of FIG. 3.
FIGS. 5A and 5B are front and side views of a plastic pin that is inserted through holes in the cover and the arm attachments, and below the cable, for blocking removal of the cover and arm attachments from the cable.

FIG. 4 is a top down view of the cover 16.

The insulator cover 16 includes a bottom bell-shaped portion 34, for covering the standard ceramic insulator 24, and a top portion 36 for covering the top of the insulator 24 and the cable 26. Note how the cover 16 in FIG. 4 is asymmetrically shaped to accommodate the cable 26 supported by the left side of the insulator 24. If the cable 26 were on the other side of the insulator 24, the cover 16 would be installed in the opposite orientation, so the same cover 16 accommodates the cable 26 being affixed on either side of the neck or on top of the insulator 24.

Figure 6:
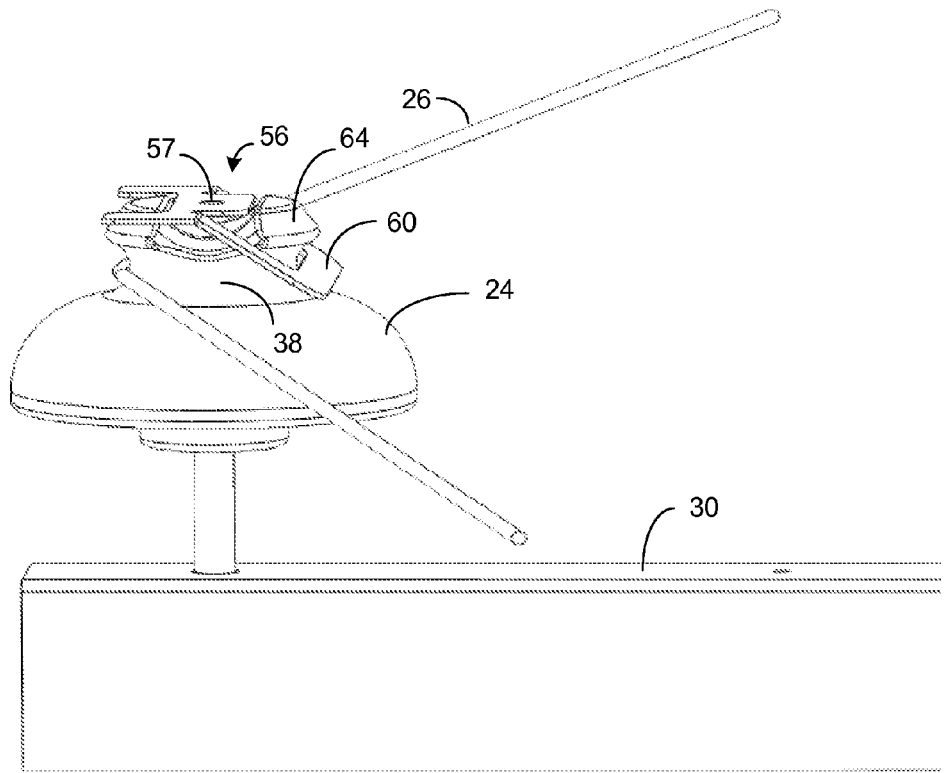
FIG. 6 is a perspective view of the plastic clip secured to an insulator, where the remainder of the cover is invisible.

A ring at the top of the bolt 28 allows the cover 16 to be placed over the insulator 24 using a hotstick. The bolt 28 and clip (shown in FIG. 6) may be manually removed, to make space in the cover 16, if the cable 26 was to be seated in the top groove of the insulator 24. Therefore, the cover 16 fits the same over the insulator 24 whether the cable 26 is affixed to the top of the insulator 24 or to its neck 38 (FIG. 6).

Typically, prior to installing the cover 16 over the insulator 24, the arms 18 and 20 are attached to the cover 16 by vertical bolts 44, which pivotally secure the arms 18/20 to the cover 16 via flanges. Each flange may be about one to two inches long, and has a hole at each end. One end is attached to the cover 16 by the bolt 44, and the other end is pivotally attached by a bolt (not shown) to the respective arm 18/20. This allows each arm 18/20 to not only pivot but to be displaced laterally to accommodate the cable 26 when it is off to one side of the insulator 26, as shown in FIG. 4. In other words, the flange allows the arms 18/20 to be coaxial with the cable 26 even when the cable 26 is not centered with respect to the insulator 24. The pivoting of the arms 18/20 also allows the arms 18/20 to accommodate a bend in the cable 26 around the insulator 24. The cover 16 has flared openings 46 to allow the arms 18/20 to pivot without any stresses on the cover system.

The cover 16 has opposing holes, and each arm 18/20 has opposing holes, that are below the cable 26. A pin 48 is inserted with a hot-stick or by hand through the two holes in the cover 16. Similar pins 50 are used for the arms 18/20. The pin 48 has a ring 52 (FIG. 5A) at one end for the hot-stick and a resilient, expandable tip 54 (FIG. 5B) at the other end. When the pin 48 is pushed through the holes, the tip 54, being narrow at its end and tapered, compresses to easily pass through the holes. The tip 54 has a greater than 60 degree angle rim portion that makes it more difficult to remove. Therefore, the pin 48 remains held in place. The pins 48 and 50 are under the cable 26 to prevent the cover 16 and arms 18/20 from being lifted off the insulator 24 and cable 26 by wind.

Figures 7, 8:
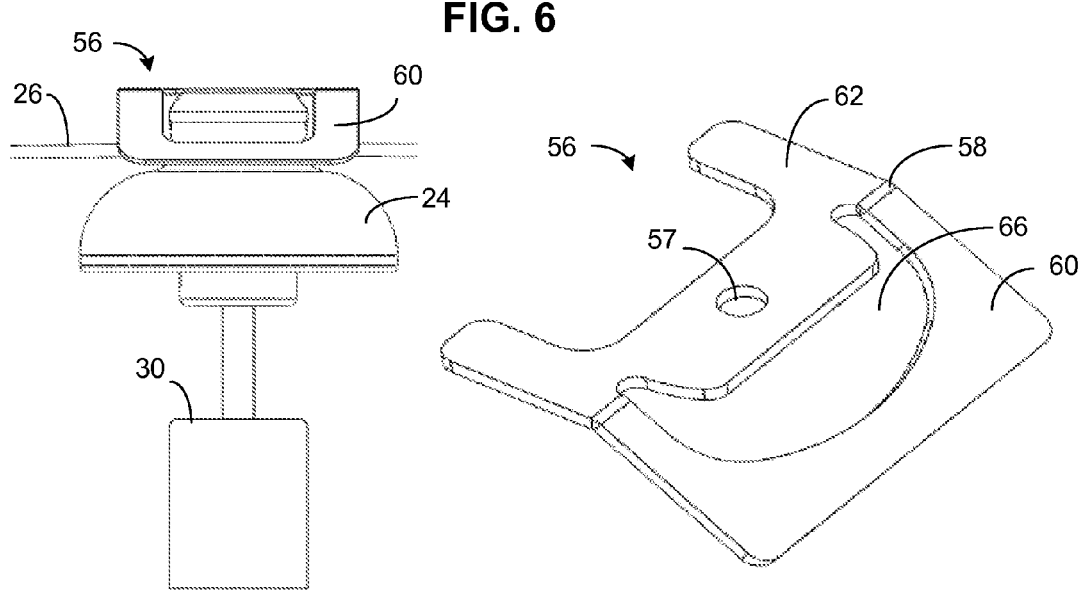
FIG. 7 is a right side view of structure of FIG. 6.
FIG. 8 is a perspective view of the clip.

To prevent the cover 16 and arms 18/20 from rotating with respect to the insulator 24 during high winds, an internal clip 56 (FIG. 6), secured to the top of the cover 16 by the bolt 28, seats in the area of the neck 38 of the insulator 24. FIG. 6 shows the clip 56 with the remainder of the cover 16 invisible. The bolt 28 fits through the hole 57 in the top of the clip 56. The hole 57 may be threaded, or the bolt 28 is secured by a nut to the clip 56. FIG. 7 is a right side view of FIG. 6.

The clip 56 is designed to allow the cover 16 to be easily placed over the insulator 24 yet perform the securing function after the cover 16 has been placed over the insulator 24. Other variations of the clip 56 are envisioned.

In one embodiment, the clip 56 is stamped out of a ⅛ inch thick, flat polymer sheet. The clip 56 is then bent, as shown in FIG. 8, under heat. The narrowed sections 58 of the clip 56 allow the flange portion 60 to easily bend with respect to the stationary base portion 62. This allows the cover 16 to be pushed down vertically over the insulator 24, where the flange portion 60 snaps into place within the neck 38 (FIG. 6) of the insulator 24 after being somewhat straightened when being pushed over the ear 64 of the insulator 24. The opening 66 in the clip 56 accommodates the ear 64.

The flange portion 60 blocks the cover 16 from tilting upward in a counter-clockwise manner, as viewed in FIG. 6. Since the cable 26 is off-centered, and on the left side of the insulator 24, the pins 48 (FIG. 3) under the cable 26 prevent the cover 16 from tilting upward in a clockwise manner.

To remove the cover 16, the bolt 28 may be removed from the cover 16. Alternatively, the cover 16 may be removed by first removing the pins 48/50 then tilting the cover 16 in the direction of the flange portion 60 to lift the cover 16 off starting from the left side (in the configuration of FIG. 6).

The clip 56 may also be formed so that the flange portion 60 does not easily bend. In such a case, the cover 16 is placed over the insulator 24 while tilted downward (toward the right in FIG. 6) to first seat the flange portion 60 in the neck 38, then straightened.

There are a variety of insulator shapes, and the insulator 24 is just one example. Other insulators are longer with sides having multiple ridges or skirts for higher voltages, and other insulators are simpler. An insulator having multiple ridges or skirts has multiple necks, and the securing clip may restrict the cover's inner diameter at any of the neck areas. The shape of the cover 16 is customized for each type of standardized insulator.

In another embodiment, the clip is secured to a side of the cover 16 rather than to its top. In another embodiment, the cover 16 is molded to form the clip integral with the cover 16. In another embodiment, there is an identical clip 56 on both internal sides of the cover 16 for symmetrically preventing tilting of the cover 16. In such a case, the clips 56 are resilient and snap over the ear of the insulator when the cover 16 is pushed over the insulator.

Having described the invention in detail, those skilled in the art will appreciate that, given the present disclosure, modifications may be made to the invention without departing from the spirit of the inventive concept described herein. Therefore, it is not intended that the scope of the invention be limited to the specific embodiments illustrated and described.

What is claimed is:

1. A dielectric cover system comprising:
   an insulator having at least one dielectric neck forming a reduced diameter portion, the insulator supporting a conductor running substantially perpendicular to the insulator, the conductor being for carrying a voltage, the insulator being supported by a support structure;
   a dielectric material shaped to fit over the insulator to cover at least a top portion of the insulator and the conductor in contact with the insulator;
   openings on opposite sides of the cover for the conductor to extend through, which allows the cover to be placed over the conductor and insulator, and removed from over the conductor and insulator, without removing the conductor from the insulator; and
   a securing clip connected to and completely internal to the cover, the clip having a first portion that fits over a second portion of the dielectric neck of the insulator as the cover is placed over the insulator to block the cover from being rotated about the insulator due to the first portion of the securing clip engaging the insulator at the reduced diameter portion of the insulator.

2. The system of claim 1 wherein the cover comprises a semi-rigid plastic.

3. The system of claim 1 wherein the first portion of the securing clip is located so as to be inserted onto the neck area of the insulator when the cover is placed over the insulator.

4. The system of claim 1 wherein the first portion of the securing clip comprises a rigid flange in the cover that seats in the reduced diameter portion of the insulator.

5. The system of claim 1 wherein the first portion of the securing clip comprises a resilient flange that seats in the reduced diameter portion of the insulator.

6. The system of claim 1 wherein the securing clip is connected to a top area of the cover.

7. The system of claim 1 wherein the conductor is supported by a side of the insulator.

8. The system of claim 1 wherein the cover is asymmetrically shaped to accommodate the conductor when the conductor is supported by a side of the insulator.

9. The system of claim 8 wherein the first portion of the securing clip is located on a side of the cover opposite the side where the conductor is supported by the side of the insulator.

10. The system of claim 1 wherein the insulator has a protruding ear portion and where the first portion of the securing clip is located below the ear portion after the cover is placed over the insulator, wherein the securing clip causes the cover to have its inner diameter be less than a diameter of the ear portion.

11. The system of claim 1 further comprising at least one arm attached to the cover to shield the conductor extending from the cover.

12. The system of claim 1 wherein the insulator and the cover are bell shaped.

13. The system of claim 1 wherein the securing clip is asymmetrically located on the cover to engage only one side of the insulator.

14. The system of claim 1 wherein the securing clip is a first securing clip, the system further comprising a second securing clip internal to the cover, where the first securing clip and the second securing clip are located on opposite internal sides of the cover.

15. The system of claim 1 wherein the support structure is a utility pole.

* * * * *